(12) United States Patent
Ren et al.

(10) Patent No.: US 10,806,293 B2
(45) Date of Patent: Oct. 20, 2020

(54) COFFEE MACHINE SCREEN AND COFFEE MACHINE

(71) Applicant: GUANGDONG MIDEA CONSUMER ELECTRICS MANUFACTURING CO., LTD., Foshan (CN)

(72) Inventors: Lizhong Ren, Foshan (CN); Jian Kuang, Foshan (CN)

(*) Notice: Subject to any disclaimer, the term of this patent is extended or adjusted under 35 U.S.C. 154(b) by 0 days.

(21) Appl. No.: 15/822,212

(22) Filed: Nov. 27, 2017

(65) Prior Publication Data

US 2018/0084939 A1    Mar. 29, 2018

Related U.S. Application Data

(63) Continuation of application No. PCT/CN2017/074234, filed on Feb. 21, 2017.

(30) Foreign Application Priority Data

Sep. 29, 2016 (CN) .......................... 2016 1 0867667
Sep. 29, 2016 (CN) ...................... 2016 2 1096196 U

(51) Int. Cl.
*A47J 31/44* (2006.01)
*A47J 31/42* (2006.01)
*A47J 31/06* (2006.01)

(52) U.S. Cl.
CPC ........... *A47J 31/4403* (2013.01); *A47J 31/42* (2013.01); *A47J 31/06* (2013.01)

(58) Field of Classification Search
CPC ........ A47J 31/42; A47J 31/14; A47J 31/0668; A47J 31/56; A47J 31/58; A47J 31/0647;
(Continued)

(56) References Cited

U.S. PATENT DOCUMENTS 3,334,574 A * 8/1967 Douglas .................. A47J 31/02
                                                                99/304
4,865,737 A    9/1989 McMichael
(Continued)

FOREIGN PATENT DOCUMENTS

CN        101161135 A    5/2008
CN        201147244 Y    11/2008
(Continued)

OTHER PUBLICATIONS

English translation of CN 204995094U.*
Extended European Search Report of EP17828828.8.
The first OA of JP Application No. 2018-512426.

*Primary Examiner* — Ibrahime A Abraham
*Assistant Examiner* — Chris Q Liu
(74) *Attorney, Agent, or Firm* — Kilpatrick Townsend & Stockton, LLP

(57) ABSTRACT

The present invention discloses a coffee machine screen and a coffee machine. The coffee machine screen includes a first screen body arranged in a cylindrical shape extending upwardly and downwardly; and a second screen body arranged annularly, and an inner ring edge of the second screen body sealingly connected to a lower portion of the first screen body. The present invention can restrict the coffee particles from passing through the screen during the stirring of the coffee, thereby improving the quality of the coffee beverage.

17 Claims, 4 Drawing Sheets

(58) Field of Classification Search
CPC ... A47J 31/0684; A47J 31/4496; A47J 31/542
USPC ......... 99/293, 286, 304, 300, 308, 307, 287, 99/284, 290, 279, 295
See application file for complete search history.

(56) References Cited

U.S. PATENT DOCUMENTS

| | | | | |
|---|---|---|---|---|
| 5,318,703 | A * | 6/1994 | Heiligman | A47J 31/605 |
| | | | | 210/264 |
| 5,590,581 | A * | 1/1997 | Strub | A47J 31/0663 |
| | | | | 99/295 |
| 5,865,095 | A * | 2/1999 | Mulle | A47J 31/0573 |
| | | | | 99/286 |
| 9,290,317 | B2 * | 3/2016 | Quinn | A47J 31/407 |
| 2004/0069704 | A1 * | 4/2004 | Yamaguchi | B01D 29/35 |
| | | | | 210/497.01 |
| 2005/0076784 | A1 * | 4/2005 | Tebo, Jr. | A47J 31/0647 |
| | | | | 99/279 |
| 2005/0076788 | A1 * | 4/2005 | Grant | A47J 31/0668 |
| | | | | 99/279 |
| 2012/0183659 | A1 | 7/2012 | Hulett et al. | |
| 2014/0245893 | A1 | 9/2014 | Vu | |
| 2014/0261019 | A1 * | 9/2014 | Conti | A23N 1/02 |
| | | | | 99/513 |
| 2017/0215627 | A1 * | 8/2017 | Fung | A47J 31/06 |

FOREIGN PATENT DOCUMENTS

| | | |
|---|---|---|
| CN | 102058318 A | 5/2011 |
| CN | 102551538 A | 7/2012 |
| CN | 103169377 A | 6/2013 |
| CN | 204889459 U | 12/2015 |
| CN | 204995094 U * | 1/2016 |
| CN | 204995094 U | 1/2016 |
| CN | 205548335 U | 9/2016 |
| EP | 0367600 A1 | 5/1990 |
| FR | 1105494 A | 12/1955 |
| JP | S5028864 B1 | 9/1975 |
| JP | H10275274 A | 10/1998 |
| JP | 2014117515 A | 6/2014 |

\* cited by examiner

COFFEE MACHINE SCREEN AND COFFEE MACHINE

CROSS-REFERENCE TO RELATED APPLICATION

The present application is a national phase entry under 35 USC § 371 of International Application PCT/CN2016/099749, filed Feb. 21, 2017, which claims the benefit of and priority to Chinese Patent Application No. 201621096196.X and 201610867667.0, filed Sep. 29, 2016, the entire disclosures of which are incorporated herein by reference.

TECHNICAL FIELD

The present invention relates to the field of household appliances, and more particularly to a coffee machine screen and a coffee machine.

BACKGROUND

In a combined coffee grinding and brewing machine, a grinding chamber is usually reused as a brewing chamber. In order to avoid the discharge of coffee grounds from a beverage outlet of the grinding chamber to the user's coffee cup, the grinding chamber is provided with a screen arranged in a cylindrical shape and sleeved at a periphery of the grinding blade set. In the process of brewing coffee, the coffee is stirred usually through the grinding blade set. In the process of stirring the coffee, coffee particles may produce centrifugal force, resulting in coarse coffee particles being pushed through the screen. The coarse coffee particles ultimately enter the beverage cup with the coffee liquid. Therefore, the quality of the coffee beverage is reduced.

SUMMARY

The main purpose of the present invention is to provide a coffee machine screen, which restricts the coffee particles from passing through the screen during the stirring of the coffee, thereby improving the quality of the coffee beverage.

In order to achieve the above purpose, a coffee machine screen provided by the present invention includes:

a first screen body arranged in a cylindrical shape extending upwardly and downwardly; and a second screen body arranged annularly, and an inner ring edge of the second screen body sealingly connected to a lower portion of the first screen body.

In one embodiment, the first screen body and the second screen body are integrated to a whole.

In one embodiment, the coffee machine screen further includes a fixed frame, and an axial upper end of the first screen body is fixedly connected to the fixed frame.

In one embodiment, a material of the first screen body is metallic, a material of the fixed frame is plastic, and the fixed frame is fixedly connected to the first screen body by injection molding.

In one embodiment, a material of the first screen body is metallic, a material of the second screen body is plastic, and the second screen body is fixedly connected to the first screen body by injection molding.

In one embodiment, each filter pore of the second screen body includes a straight pore section communicating with an upper surface of the second screen body and a cone pore section communicating with a lower surface of the second screen body, the cone pore section being gradually enlarged towards a direction away from the straight pore section.

In one embodiment, a diameter of a filter pore of the second screen body on an upper surface thereof is in a range of 0.2 mm to 0.8 mm.

In one embodiment, a distance between the inner ring edge and an outer ring edge of the second screen body is in a range of 10 mm to 30 mm.

In one embodiment, the second screen body extends obliquely downwardly or obliquely upwardly in a radially outward direction.

In one embodiment, the second screen body extends obliquely downwardly in the radially outward direction and is inclined at a range of 1°-10° with respect to a horizontal direction.

In one embodiment, a plurality of hand clasping portions are provided on an inner peripheral surface of an upper portion of the screen.

In one embodiment, a mesh range of the first screen body is 80 mesh to 150 mesh.

In one embodiment, the first screen body is gradually enlarged from bottom to top.

In one embodiment, an inclination angle between the first screen body and a vertical direction is in a range of 5° to 30°.

In one embodiment, the first screen body includes a reinforcing rib, the reinforcing rib at least including a reinforcing rib ring in a circumferential direction of the first screen body.

In one embodiment, a lower end of the first screen body is closed.

In addition, in order to achieve the above purpose, the present invention provides a coffee machine, including:

a grinding chamber including a cavity and a cover, the cover enclosing the cavity to form a grinding cavity, a bottom of the grinding cavity being provided with a beverage outlet;

a grinding device including a grinding blade set provided in the grinding cavity, and a motor provided outside the grinding cavity for driving rotation of the grinding blade set;

a hot water supply device in communication with the grinding cavity; and a coffee machine screen including a first screen body and a second screen body, the first screen body being arranged in a cylindrical shape extending upwardly and downwardly, the second screen body being arranged annularly, and an inner ring edge of the second screen body being sealingly connected to a lower portion of the first screen body;

the first screen body being sleeved at a periphery of the grinding blade set and a lower end of the first screen body being sealingly connected to the bottom of the grinding cavity;

an outer ring edge of the second screen body being sealingly connected to a side wall of the grinding cavity;

a region of the grinding cavity surrounded by the first screen body forming a primary filter cavity, the second screen body dividing an other region of the grinding cavity into a secondary filter cavity above the second screen body and a beverage cavity below the second screen body, the beverage outlet being communicated with the beverage cavity.

In one embodiment, the outer ring edge of the second screen body includes a mounting flange extending downwardly or upwardly, an outer peripheral surface of the mounting flange being provided with a positioning ring groove for sleevedly positioning a sealing ring, the sealing ring abutting the side wall of the grinding cavity.

In one embodiment, the mounting flange extends downwardly and a lower end of the mounting flange abuts a bottom wall of the grinding cavity.

In one embodiment, the first screen body includes a reinforcing rib, the reinforcing rib at least includes a reinforcing rib ring in a circumferential direction of the first screen body, and the first screen body comprises an annular region radially corresponding to the grinding blade set, the reinforcing rib ring being provided in the annular region.

In one embodiment, a bottom wall of the cavity is provided with a first boss, the lower end of the first screen body sealingly abutting an upper end face of the first boss, the second screen body being connected to the lower end of the first screen body, the secondary filter cavity being formed between the first screen body and a side wall of the cavity, the beverage cavity being formed between an outer peripheral surface of the first boss and the side wall of the cavity. In one embodiment, the upper end face of the first boss is provided with a second boss, the first screen body being sleeved at the second boss to be positioned in the grinding cavity.

In one embodiment, the lower end of the first screen body abuts a bottom wall of the cavity, a distance being formed between the lower end of the first screen body and a junction between the second screen body and the first screen body, the secondary filter cavity being formed between a portion of the first screen body above the second screen body and a side wall of the cavity, the beverage cavity being formed between a portion of the first screen body below the second screen body and the side wall of the cavity.

In one embodiment, an upper portion of the coffee machine screen is sealingly connected to the cover; or the upper portion of the coffee machine screen is sealingly connected to the cavity, and the cavity is sealingly connected to the cover.

In the technical solution of the present invention, the grinding cavity is divided into a primary filter cavity, a secondary filter cavity located on the periphery of the primary filter cavity, and a beverage cavity located below the secondary filter cavity. Therefore, in the process of grinding the coffee beans or stirring the coffee, even if the coarse coffee particles pass through the first screen body into the secondary filter cavity under the action of centrifugal force, the second screen body can also restrict the coarse coffee particles in the secondary filter cavity, thereby effectively avoiding the coarse coffee particles from entering the beverage cavity. Therefore, the quality of coffee beverage will be improved.

BRIEF DESCRIPTION OF THE DRAWINGS

In order to more clearly illustrate the embodiments of the present invention or the technical solutions in the prior art, the following drawings, which are to be used in the description of the embodiments or the prior art, will be briefly described. It will be apparent that the drawings in the following description only illustrate some embodiments of the present invention. For one ordinary skill in the art, other drawings may be obtained from the structure shown in these Figures without making creative effort.

DESCRIPTION OF THE REFERENCE NUMERAL

Figure 1:
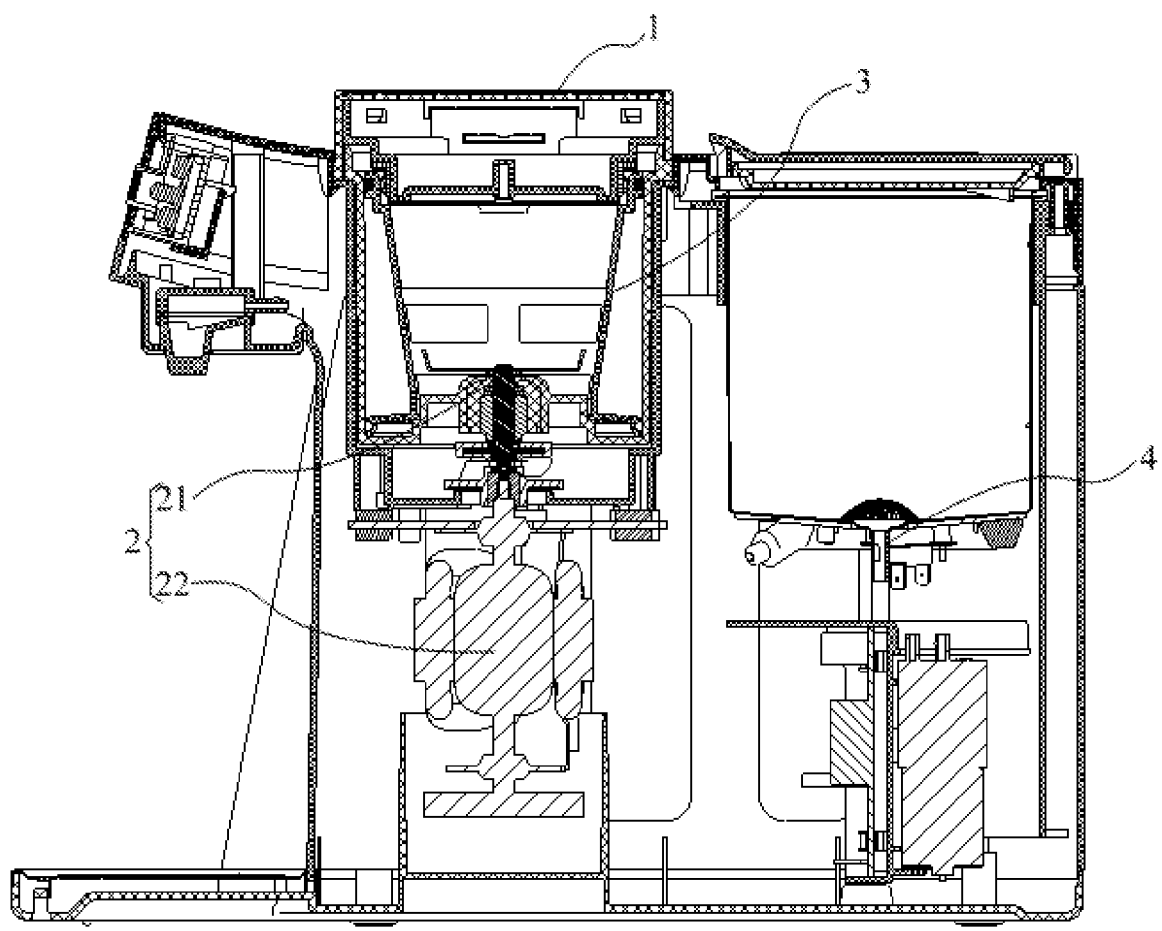
FIG. 1 is a schematic view of an embodiment of the coffee machine of the present invention.

| Reference numeral | Name | Reference numeral | Name |
| --- | --- | --- | --- |
| 1 | Grinding chamber | 11 | Cavity |
| 12 | Cover | 13 | Beverage outlet |
| 14 | First boss | 15 | Second boss |
| 16 | Protruding portion | 10 | Grinding cavity |
| 101 | Primary filter cavity | 102 | Secondary filter cavity |
| 103 | Beverage cavity | 2 | Grinding device |
| 21 | Grinding blade set | 22 | Motor |
| 3 | Coffee machine screen | 31 | First screen body |
| 32 | Second screen body | 33 | Fixed frame |
| 34 | Hand clasping portion | 311 | Reinforcing rib |
| 311a | Reinforcing rib ring | 311b | Reinforcing rib strip |
| 321 | Filter pore | 321a | Straight pore section |
| 321b | Cone pore section | 322 | Mounting flange |
| 323 | Positioning ring groove | 4 | Hot water supply device |
| 51 | Second sealing ring | 52 | Third sealing ring |
| 324 | Inner ring edge | | |

The realization of the purpose, functional features and advantages of the present invention will be further described with reference to the accompanying drawings.

DETAILED DESCRIPTION

It will be apparent that the described embodiments are merely a part of the embodiments of the present invention and are not intended to be exhaustive. All other embodiments obtained by one ordinary skill in the art without making creative effort are within the scope of the present invention, based on embodiments described in the present invention.

It should be noted that if the embodiment of the present invention relates to directional indications (such as upper, lower, left, right, front, rear, . . . ), the directional indications are only used to interpret the relative positional relationship, the movement, etc., between the components in a particular posture (shown in the accompanying drawings), and the directional indications are changed accordingly if the particular posture changes.

In addition, if the description of "first", "second" or the like is included in the embodiments of the present invention, it is used for descriptive purposes only and is not to be construed as an indication or suggestion of its relative importance or implied indications of the number of technical features indicated. Thus, features defined by "first" or "second" may expressly or implicitly include at least one of the features. In addition, the technical solutions between various embodiments may be combined with each other, but may be based on the ability of one of ordinary skill in the art carrying them out. When the combination of technical solutions is contradictory or impossible to achieve, the combination of the technical solutions should not be presented and are not within the scope of the invention as claimed.

The present invention provides a coffee machine screen and a coffee machine having the coffee machine screen.

Figure 2:
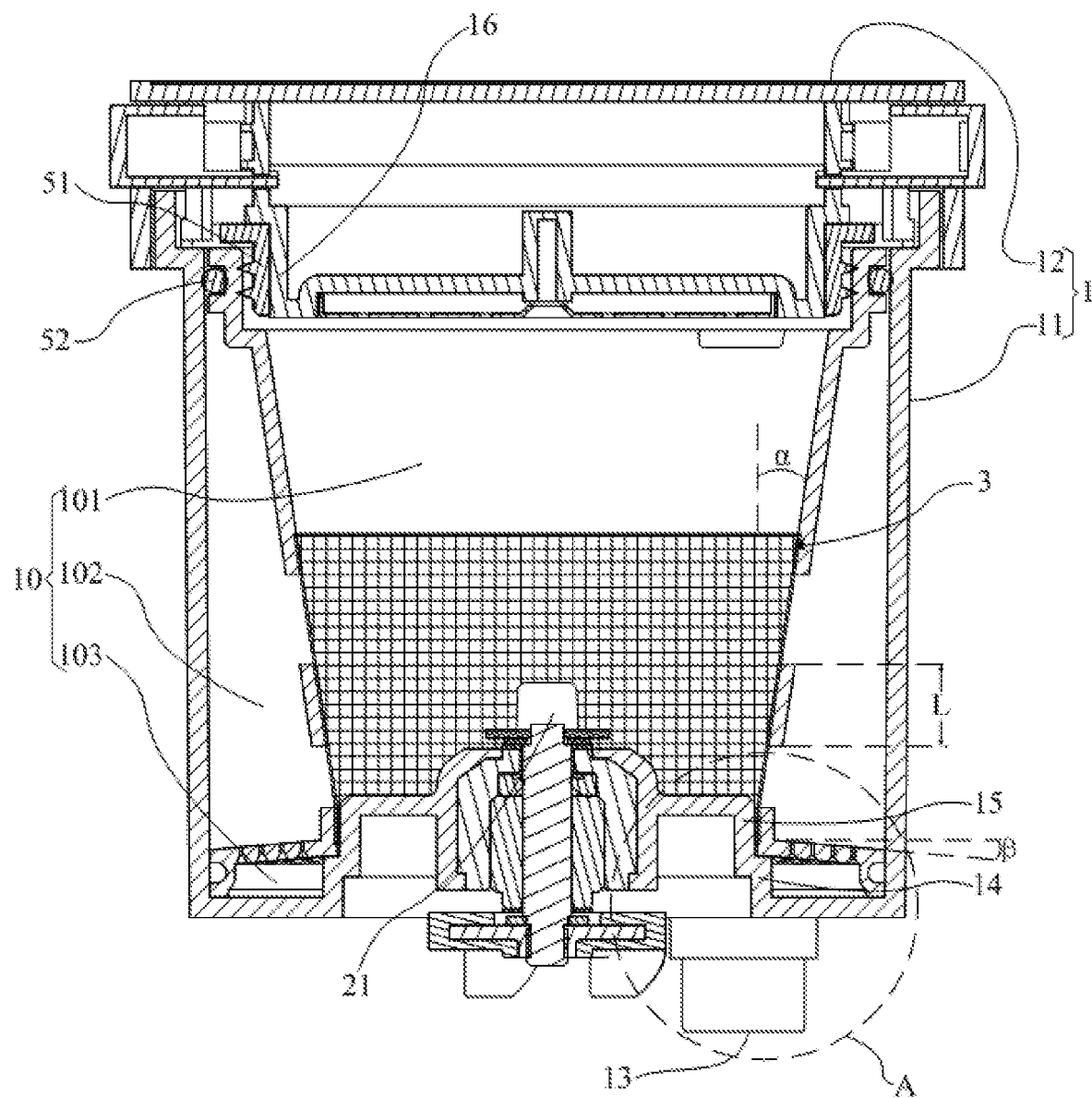
FIG. 2 is a schematic view of the structure of the grinding chamber, the coffee machine screen and the grinding blade set of the coffee machine in FIG. 1.
Figure 3:
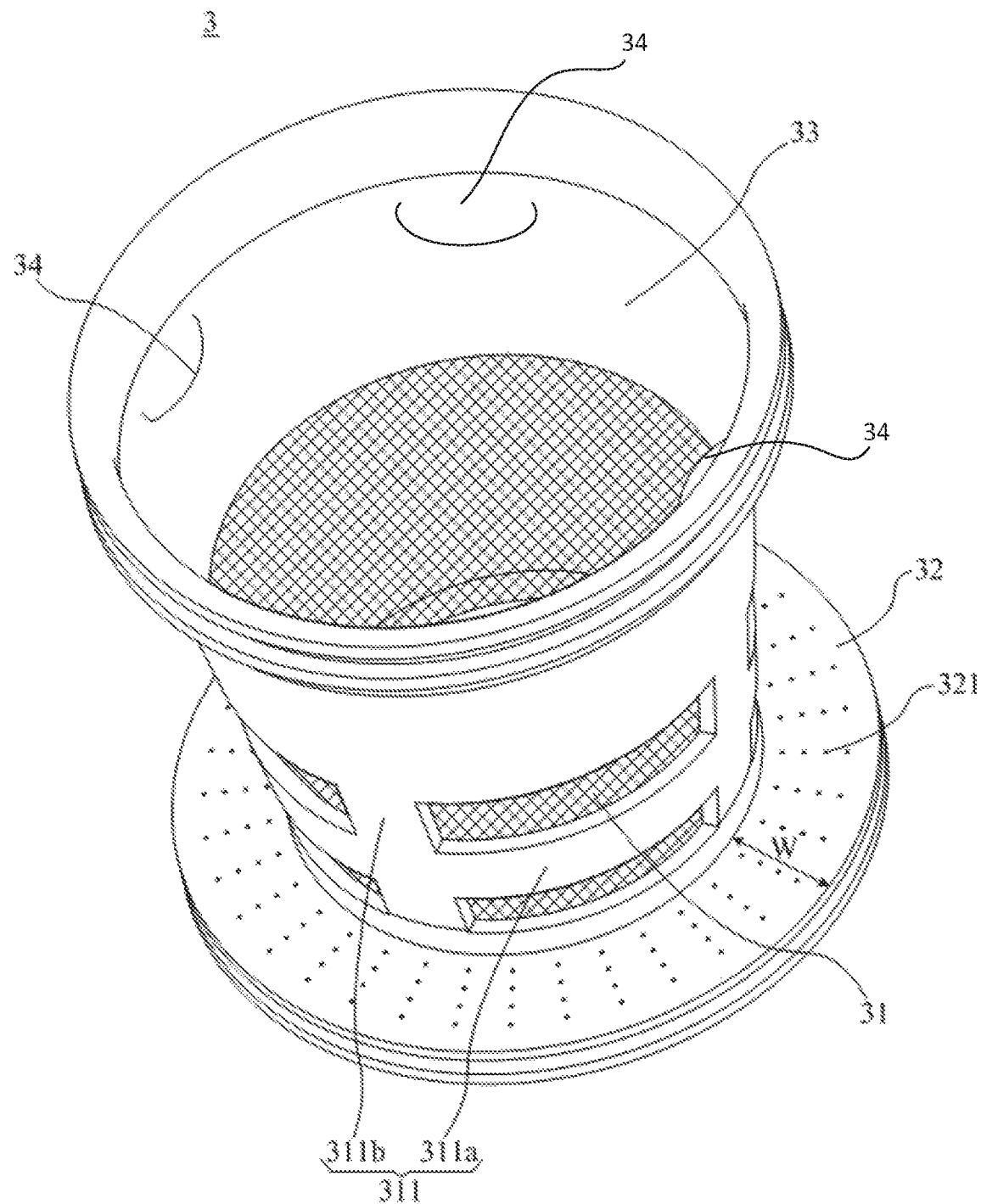
FIG. 3 is an enlarged schematic view of the structure corresponding to the "A" position in FIG. 2.

Referring to FIGS. 1 to 3, in an embodiment of the present invention, the coffee machine includes:

a grinding chamber 1 including a cavity 11 and a cover 12, the cover 12 enclosing the cavity 11 to form a grinding cavity 10, a bottom of the grinding cavity 10 being provided with a beverage outlet 13;

a grinding device 2 including a grinding blade set 21 provided in the grinding cavity 10, a motor 22 provided outside the grinding cavity 10 for driving rotation of the grinding blade set 21;

a hot water supply device 4 communicating with the grinding cavity 10;

an electric control device (not shown in the Figures) electrically connected to the grinding device 2 and the hot water supply device 4 for controlling the operation of the grinding device 2 and the hot water supply device 4, and a coffee machine screen 3 in the grinding cavity 10, including a first screen body 31 and a second screen body 32, the first screen body 31 being arranged in a cylindrical shape extending upwardly and downwardly, the second screen body 32 being arranged annularly, and an inner ring edge 324 of the second screen body 32 being sealingly connected to a lower portion of the first screen body 31. It is understood that the direction from the inner ring edge 324 to the outer ring edge of the second screen body 32 is a direction away from the outer peripheral surface of the first screen body 31.

The first screen body 31 is sleeved at a periphery of the grinding blade set 21 and a lower end of the first screen body 31 is sealingly connected to the bottom of the grinding cavity 10. The outer ring edge of the second screen body 32 is sealingly connected to a side wall of the grinding cavity 10. A region of the grinding cavity 10 surrounded by the first screen body 31 forms a primary filter cavity 101. The second screen body 32 divides the other region of the grinding cavity 10 into a secondary filter cavity 102 above the second screen body 32 and a beverage cavity 103 below the second screen body 32. The beverage outlet 13 is communicated with the beverage cavity 103.

In the technical solution of the present invention, the grinding cavity 10 is divided into a primary filter cavity 101, a secondary filter cavity 102 located on the periphery of the primary filter cavity 101, and a beverage cavity 103 located below the secondary filter cavity 102. Therefore, in the process of grinding the coffee beans or stirring the coffee, even if the coarse coffee particles pass through the first screen body 31 into the secondary filter cavity 102 under the action of centrifugal force, the second screen body 32 can also restrict the coarse coffee particles in the secondary filter cavity 102, thereby effectively avoiding the coarse coffee particles from entering the beverage cavity 103. Therefore, the quality of coffee beverage will be improved.

It is noted that in the present embodiment, the coffee machine screen 3 is used for a coffee machine in which the grinding cavity 10 can be reused as the brewing chamber. However, the present design is not limited thereto. In other embodiments, the coffee machine screen 3 can also be used for a coffee machine having a separate grinding chamber and a separate brewing chamber, and the coffee machine screen 3 can be provided in the brewing chamber. In one embodiment, when the coffee machine screen 3 is applied to the coffee machine having an independent brewing chamber, the grinding blade set is not provided at the bottom of the brewing chamber, and the lower end of the first screen body 31 can be closed such that the primary filter cavity 101 is absolutely isolated from the beverage cavity 103.

In the present embodiment, the first screen body 31 and the second screen body 32 are preferably integrated to a whole. Therefore, the present design can realize the overall assembling, disassembling and cleaning of the coffee machine screen 3, in comparison with the separate arrangement of the two. Without loss of generality, the first screen body 31 and the second screen body 32 may be integrally molded, die-cast or sheet metal parts, etc. Of course, the materials of the first screen body 31 and the second screen body 32 may be different. For example, one of the first screen body 31 and the second screen body 32 is of a metallic material and the other is of a plastic material, and the one with plastic material is fixed to the one with metal material by injection molding.

Furthermore, the coffee machine screen 3 further includes a fixed frame 33 (see FIG. 3), and the axial upper end of the first screen body 31 is fixedly connected to the fixed frame 33. In the present embodiment, the upper portion of the coffee machine screen 3 is fixed to the upper portion of the grinding cavity 10 by the fixed frame 33. It will be appreciated that the fixed frame 33 is provided with a structure fixed to the upper portion of the grinding cavity 10 (e.g., but not limited to an abutting flange, a lap flange, etc.), and the addition of the fixed frame 33 avoids the need that a structure which is fixed to the upper portion of the grinding cavity 10 is directly provided at the upper portion of the first screen body 31, thereby simplifying the structure of the first screen body 31 itself.

Further, the first screen body 31 is of a metallic material to ensure that the rigidity of the first screen body 31 is good. In one embodiment, the first screen body 31 has good rigidity and can improve the ability of the first screen body 31 for withstanding the outward impact force of coffee beans and coffee particles. In one embodiment, the first screen body 31 is preferably made of a stainless steel material having a strong rigidity that is more resistant to the outward impact force of the coffee beans and coffee particles. Of course, in other embodiments, the first screen body 31 may be, but is not limited to, made of other metal materials such as aluminum alloy, titanium alloy or the like. The fixed frame 33 is of a plastic material, and the fixed frame 33 can be easily fixed to the axial upper end of the first screen body 31 by injection molding. The injection molding process is a mature processing technology, which facilitates the batch processing and manufacture of the coffee machine screen 3. In addition, the fixed frame 33 which is of a plastic material facilitates forming of a structure of the fixed frame 33 which is fixed with the upper portion of the grinding cavity 10. Of course, in other embodiments, the fixed frame 33 may also be fixed to the first screen body 31 by means of bonding or welding.

In the present embodiment, the second screen body 32 is also of a plastic material, so that the second screen body 32 can be easily fixed to the axial lower end of the first screen body 31 by injection molding. The injection molding process is a mature processing technology, which facilitates the batch processing and manufacture of the coffee machine screen 3. Of course, in other embodiments, the second screen body 32 may also be fixed to the first screen body 31 by means of bonding or welding. In yet other embodiments, the second screen body 32 may also be of a metallic material.

In the present embodiment, the filter pore 321 on the second screen body 32 is directly injection-molded. To facilitate the demolding of the injection mold, any filter pore 321 of the second screen body 32 includes a straight pore section 321a communicating with the upper surface thereof and a cone pore section 321b which communicates with the lower surface thereof and is gradually enlarged towards a direction away from the straight pore section 321a. Obviously, the filter pore 321 of the second screen body 32 is connected to the secondary filter cavity 102 through the straight pore section 321a, and to the beverage cavity 103 through the cone pore section 321b. However, the present design is not limited thereto. In other embodiments, any of the filter pores 321 of the second screen body 32 may also be an integral cone pore which is gradually enlarged towards a direction away from the secondary filter cavity 102. In addition, in yet other embodiments, the filter pores 321 on the second screen body 32 may also be later perforated and any filter pore 321 may be formed as an integral straight pore.

Figure 4:
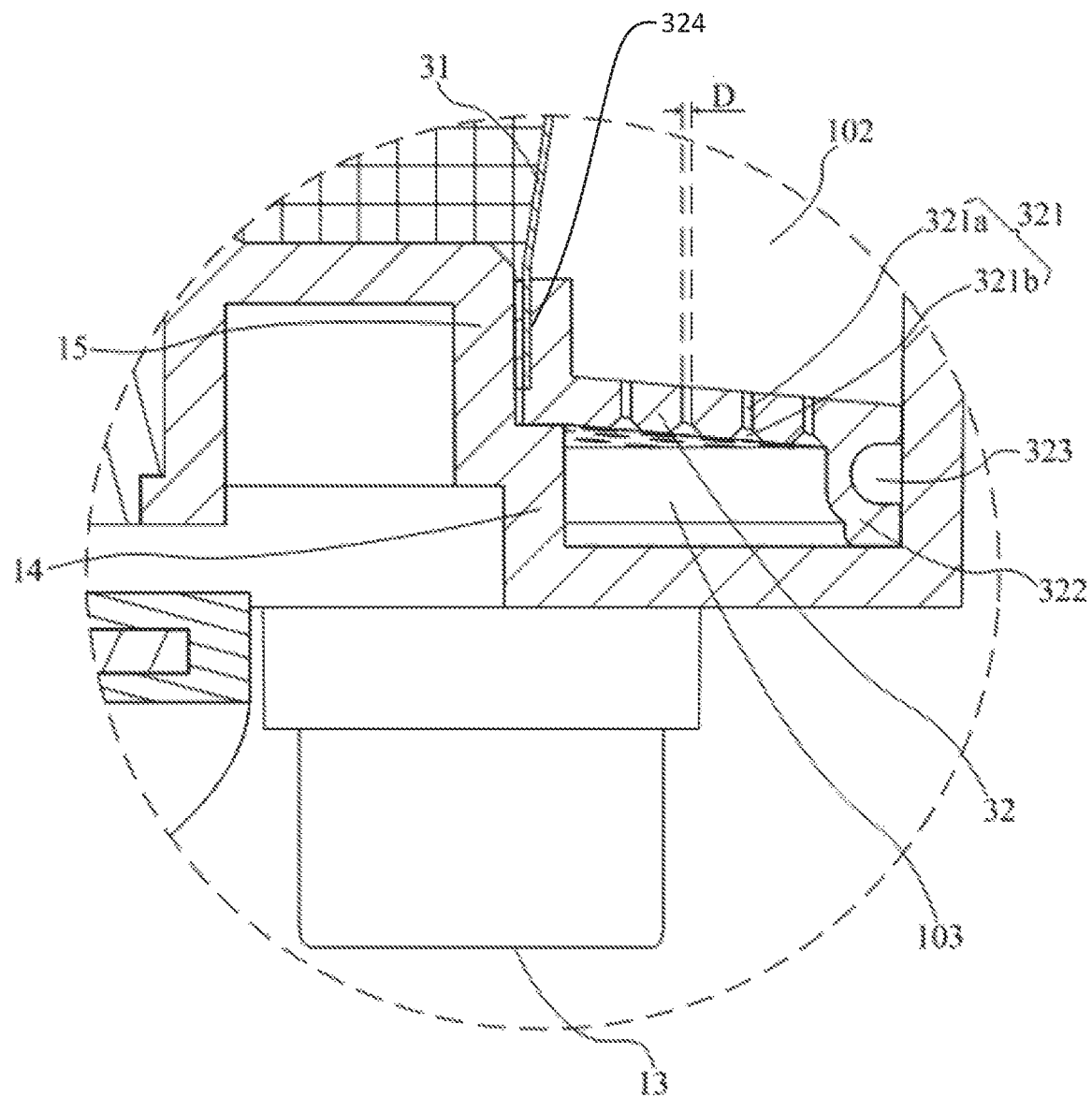
FIG. 4 is a schematic view of the structure of a screen of the coffee machine in FIG. 2.

Referring to FIG. 4, in the present embodiment, the diameter D of the filter pore 321 of the second screen body 32 on the upper surface is preferably in the range of 0.2 mm to 0.8 mm, so that the filter pore 321 of the second screen body 32 is small enough to prevent the coffee grounds from entering the beverage cavity 103 from the secondary filter cavity 102. Of course, in other embodiments, the filter pore 321 of the second screen body 32 may be of a smaller pore size to increase the effect of restricting the coffee grounds.

In addition, the mesh range of the first screen body 31 is preferably in the range of 80 mesh to 150 mesh, and the first screen body 31 under the mesh range has meshes each having a moderate pore size so that when the coffee is brewed, most of coffee grounds is restricted in the primary filter cavity 101. Of course, in other embodiments, the first screen body 31 may also have a smaller mesh range to reduce the cost of the coffee machine screen 3.

It will be appreciated that since most of the coffee grounds are isolated in the primary filter cavity 101, the secondary filter cavity 102 may only need a small space. Therefore, in this embodiment, the distance W between the inner ring edge 324 of the second screen body 32 and the outer ring edge is preferably in the range of 10 mm to 30 mm (see FIG. 3).

In addition, in order to prevent the deposition of coffee grounds from blocking the filter pores 321 in the second screen body 32, the second screen body 32 extends obliquely downwardly or obliquely upwardly in a radially outward direction so that the coffee grounds, under the action of its own gravity, flows toward the outer ring edge or inner ring edge 324 of the second screen body 32 and is only deposited on the outer ring edge or inner ring edge 324 of the second screen body 32. In the present embodiment, since the second screen body 32 is fixed to the lower end of the first screen body 31 by injection molding, the second screen body 32 extends obliquely downwardly in the radially outward direction for ease of demolding. Of course, the inclination angle of the second screen body 32 can not be too large, otherwise the distance W of the second screen body 32 needs to be large enough to ensure that the space of the secondary filter cavity 102 is not too small. Therefore, the inclination angle β of the second screen body 32 between the radially outward direction and the horizontal direction is preferably in the range of 1° to 10° (see FIG. 2).

In this embodiment, generally, the radial dimension of the grinding cavity 10 is adapted to that of the outer ring edge of the second screen body 32. Therefore, the outer ring edge of the second screen body 32 is in tight sealing abutment against the side wall of the grinding cavity 10 so as to sealingly isolate the secondary filter cavity 102 from the beverage cavity 103.

In addition, in order to further ensure the sealability of connection between the outer ring edge of the second screen body 32 and the side wall of the grinding cavity 10, a first sealing ring (not shown in the Figures) may be added between the outer ring edge of the second screen body 32 and the side wall of the grinding cavity 10. Specifically, a mounting flange 322 extending downward or upwardly may be provided at the outer ring edge of the second screen body 32, and the outer peripheral surface of the mounting flange 322 is provided with a positioning ring groove 323 for sleevedly positioning the first sealing ring to position the first sealing ring on the mounting flange 322. When the first sealing ring is mounted, the first sealing ring portion partially protrudes from the positioning ring groove 323 and resiliently abuts the side wall of the grinding cavity 10. In the present embodiment, the mounting flange 322 extends downwardly and the lower end of the mounting flange 322 abuts the bottom wall of the grinding cavity 10. Therefore, on the one hand, an additional sealing barrier is provided for the sealing isolation of the secondary filter cavity 102 and the beverage cavity 103; on the other hand, the lower end of the flange 322 can also provide support for the coffee machine screen 3.

With continued reference to FIG. 4, in the present embodiment, the bottom wall of the cavity 11 is provided with a first boss 14. The lower end of the first screen body 31 is in sealing abutment against the upper end face of the first boss 14, and the second screen body 32 is connected to the lower end of the first screen body 31. The secondary filter cavity 102 is formed between the first screen body 31 and the side wall of the cavity 11, and the beverage cavity 103 is formed between the outer peripheral surface of the first boss 14 and the cavity 11. It is to be understood that due to the arrangement of the first boss 14, it may be convenient to space the second screen body 32 from the bottom wall of the grinding cavity 10, providing the beverage cavity 103 with a vertical depth. In the present embodiment, in order to prevent the first screen body 31 from rocking in the grinding cavity 10 and even producing the phenomenon of colliding with the grinding blade set 21 during the operation of the coffee machine, the upper end surface of the first boss 14 is preferably provided with a second boss 15 for the first screen body being sleeved at the second boss 15 to be positioned in the grinding cavity 10.

The present design is not limited thereto. In other embodiments, the first boss 14 may not be provided so that the lower end of the first screen body 31 directly abuts the bottom wall of the cavity 11, but there is a distance formed between the lower end of the first screen body 31 and a junction between the second screen body 32 and the first screen body 31. Therefore, the secondary filter cavity 102 is formed between a portion of the first screen body 31 above the second screen body 32 and the side wall of the cavity 11, and the beverage cavity 103 is formed between a portion of the first screen body 31 below the second screen body 32 and the side wall of the cavity 11. In order to facilitate the positioning of the first screen body 31 and to prevent the first screen body 31 from rocking, the bottom of cavity 11 is still provided with the second boss 15 for the first screen body 31 being sleeved at the second boss 15.

In addition, the first screen body 31 is preferably arranged in a hollow cylindrical shape gradually enlarged from bottom to top. Therefore, the coffee machine screen 3 may have a large upper opening so as to add the coffee beans and hot water to the primary filter cavity 101. Without loss of generality, the inclination angle α between the first screen body 31 and the vertical direction is preferably in the range of 5° to 30° (see FIG. 2).

Referring to FIGS. 2 and 3, in the present embodiment, the first screen body 31 is further provided with a reinforcing rib 311 at least including a reinforcing rib ring 311a provided in the circumferential direction of the first screen body 31, thereby enhancing the rigidity of the first screen body 31 in the circumferential direction to resist the outward impact force of the coffee beans and the coffee particles in order to prevent deformation of the first screen body 31, thus extending the life of the coffee machine screen 3. In addition, in order to further improve the overall rigidity of the first screen body 31, the reinforcing rib 311 further includes a reinforcing rib strip 311*b* which intersects the reinforcing rib ring 311*a*. Without loss of generality, the reinforcing rib strip 311*b* may extend along the axial direction of the first screen body 31, or be inclined with respect to the axial direction of the first screen body 31. In one embodiment, the upper end of the reinforcing rib strip 311*b* is preferably fixed to the fixed frame 33 so as to better ensure the rigidity of the first screen body 31. It is to be noted that in this embodiment, the reinforcing rib 311 is also preferably of a plastic material, and thus the reinforcing rib 311 can be easily fixed to the first screen body 31 by injection molding, thereby facilitating batch processing and manufacture of the coffee machine screen 3. In one embodiment, the fixed frame 33 and the reinforcing rib 311 can be injection molded at one time, and the processing is convenient.

In the present embodiment, the first screen body 31 further has an annular region radially corresponding to the grinding blade set 21, and the reinforcing rib ring 311*a* is provided in the annular region. It will be appreciated that during the grinding of the coffee beans by the grinding blade set 21, the annular regions are subjected to strongest outward impact force from the coffee beans and coffee particles. The reinforcing rib ring 311*a* is purposefully provided in the annular region to directly increase the rigidity of the annular region, and the impact resistance of the coffee machine screen 3 can be more effectively improved.

Without loss of generality, in this embodiment, the width of the projection of the grinding blade set 21 in the axial direction of the first screen body 31 is approximately 8 mm. In the present embodiment, one reinforcing rib ring 311*a* is provided in the annular region. For the purpose of effectively improving the impact resistance of the first screen body 31, the width range L of the one reinforcing rib ring 311*a* is preferably 6 mm to 12 mm (see FIG. 2).

It should be noted that the present design is not limited thereto. In other embodiments, in order to more effectively improve the impact resistance of the coffee machine screen 3, there may be parallelly and spacedly provided a plurality of reinforcing rib ring 311*a* on the first screen body 31, and the arrangement density of the plurality of reinforcing rib ring 311*a* in the annular region is greater than that on both sides of the annular region in the axial direction.

In the present embodiment, furthermore, the upper portion of the coffee machine screen 3 is sealingly connected to the cover 12. Therefore, the water inflow rate of the hot water supply device 4 can be adjusted to be greater than the water outflow rate of the coffee machine screen 3. When the hot water added diffuses over the filter pore portion of the first screen body 31, a pressure space can be formed in the upper portion of the primary filter cavity 101 to pressure-brewing the coffee so as to sufficiently infiltrate the coffee powder. Therefore, the brewed coffee is stronger. The present design is not limited thereto. In other embodiments, the upper portion of the coffee machine screen 3 may be sealingly connected to the cavity 11 and the cavity 11 may be sealingly connected to the cover 12 to form a pressure space in the upper portion of the primary filter cavity 101.

In the present embodiment, on the upper portion of the coffee machine screen 3 is the fixed frame 33, and the cover 12 is provided with a protruding portion 16 extending into the fixed frame 33. A second sealing ring 51 is provided between the outer edge of the protruding portion 16 and the inner edge of the fixed frame 33 for realizing a sealing connection between the fixed frame 33 and the protruding portion 16, as shown in FIG. 2. In addition, in the present embodiment, a third sealing ring 52 is provided between the outer peripheral surface of the fixed frame 33 and the inner peripheral surface of the upper portion of the cavity 11 for realizing a sealing connection between the upper portion of the coffee machine screen 3 and the cavity 11. Furthermore, the upper portion of the coffee machine screen 3 is sealingly connected to the cover 12 so that the grinding cavity 10 is integrally sealed. Therefore, after brewing the coffee, the coffee cannot flow naturally from the beverage outlet 13. It is necessary to impose the pressure in grinding cavity 10 by the hot water supply device 4 to discharge the coffee from the beverage outlet 13 so as to achieve pressurized extraction of the coffee, thereby improving the quality of coffee.

Referring to FIG. 3, in the present embodiment, a plurality of hand clasping portions 34 are preferably provided on the upper inner peripheral surface of the coffee machine screen 3 in order to facilitate removal of the coffee machine screen 3 by a user. Specifically, the hand clasping portions 34 are formed on the inner peripheral surface of the fixed frame 33 and in the form of a protrusion. However, the present design is not limited thereto. In other embodiments, the hand clasping portions 34 may be formed on the fixed frame 33 and in the form of a groove. In addition, when the fixed frame 33 is not provided on the coffee machine screen 3, the hand clasping portions 34 may be directly provided on the upper inner peripheral surface of the first screen body 31.

The above are only preferred embodiments of the present invention, and not intended to limit the scope of the present invention. All under the concept of the present invention, including equivalent structural transformations made by the description and drawings of the present invention or direct/indirect application in the other related technical fields are within the scope of protection of the present invention.

What is claimed is:

1. A coffee machine screen, comprising:
   a first screen body arranged in a cylindrical shape extending upwardly and downwardly, wherein the first screen body is configured to provide a first screen of the coffee machine screen; and
   a second screen body arranged annularly, an inner ring edge of the second screen body being connected to a lower portion of the first screen body; and, wherein at least a portion of the second screen body is located outside of a peripheral of the first screen body to form a dish-edge like second screen in addition to the first screen provided by the first screen body, and the second screen body extends obliquely downwardly in a radially outward direction,
   wherein the first screen body comprises multiple first filter pores, the second screen body comprises multiple second filter pores, both the first screen body and the second screen body are configured to filter coffee particles;
   wherein diameter of the multiple second filter pores is larger than diameter of the multiple first filter pores;
   wherein the multiple second filter pores comprises a straight pore section communicating with an upper surface of the second screen body and a cone pore section communicating with a lower surface of the second screen body, the cone pore section being gradually enlarged towards a direction away from the straight pore section;

wherein diameter of the straight pore section of the multiple second filter pores is larger than diameter of the multiple first filter pores;

wherein a diameter of the straight pore section of the multiple second filter pores is in a range of 0.2 mm to 0.8 mm.

2. The coffee machine screen according to claim 1, wherein the first screen body and the second screen body are integrated as a whole structure forming the coffee machine screen.

3. The coffee machine screen according to claim 2, wherein a material of the first screen body is metallic, a material of the second screen body is plastic, and the second screen body is fixedly connected to the first screen body by injection molding.

4. The coffee machine screen according to claim 1, wherein diameter of the second filter pores of the second screen body on an upper surface is larger than diameter of the multiple first filter pores.

5. The coffee machine screen according to claim 1, wherein an inclination angle of the second screen body relative to horizontal direction is in a range of 1° to 10°.

6. The coffee machine screen according to claim 1, wherein a plurality of hand clasping portions are provided on an inner peripheral surface of an upper portion of the first screen body.

7. The coffee machine screen according to claim 1, wherein the first screen body is gradually enlarged from bottom to top.

8. A coffee machine, comprising:
a grinding chamber comprising a cavity and a cover, the cover enclosing the cavity to form a grinding cavity, a bottom of the grinding cavity being provided with a beverage outlet;
a grinding device comprising a grinding blade set provided in the grinding cavity, and a motor provided outside the grinding cavity for driving rotation of the grinding blade set;
a hot water supply device in communication with the grinding cavity; and
a coffee machine screen comprising a first screen body and a second screen body, the first screen body being arranged in a cylindrical shape extending upwardly and downwardly and providing a first screen for the coffee machine screen, the second screen body being arranged annularly, and an inner ring edge of the second screen body being connected to a lower portion of the first screen body, wherein at least a portion of the second screen body is located outside of a peripheral of the first screen body to form a dish-edge like second screen in addition to the first screen provided by the first screen body, and the second screen body extends obliquely downwardly in a radially outward direction;
the first screen body being sleeved at a periphery of the grinding blade set and a lower end of the first screen body being connected to the bottom of the grinding cavity; and
an outer ring edge of the second screen body being connected to a side wall of the grinding cavity; and,
wherein a region of the grinding cavity surrounded by the first screen body forming a primary filter cavity, the second screen body dividing another region of the grinding cavity into a secondary filter cavity above the second screen body and a beverage cavity below the second screen body, the beverage outlet being communicated with the beverage cavity;

wherein the first screen body comprises multiple first filter pores, the second screen body comprises multiple second filter pores, both the first screen body and the second screen body are configured to filter coffee particles;

wherein diameter of the multiple second filter pores is larger than diameter of the multiple first filter pores;

wherein the multiple second filter pores comprises a straight pore section communicating with an upper surface of the second screen body and a cone pore section communicating with a lower surface of the second screen body, the cone pore section being gradually enlarged towards a direction away from the straight pore section;

wherein diameter of the straight pore section of the multiple second filter pores is larger than diameter of the multiple first filter pores;

wherein a diameter of the straight pore section of the multiple second filter pores is in a range of 0.2 mm to 0.8 mm.

9. The coffee machine according to claim 8, wherein the outer ring edge of the second screen body comprises a mounting flange extending downwardly or upwardly, an outer peripheral surface of the mounting flange being provided with a positioning ring groove for positioning a sealing ring, the sealing ring abutting the side wall of the grinding cavity.

10. The coffee machine according to claim 9, wherein the mounting flange extends downwardly and a lower end of the mounting flange abuts a bottom wall of the grinding cavity.

11. The coffee machine according to claim 8, wherein the first screen body comprises a reinforcing rib, the reinforcing rib at least comprising a reinforcing rib ring in a circumferential direction of the first screen body, and the first screen body comprises an annular region radially surrounding the grinding blade set, the reinforcing rib ring being provided in the annular region.

12. The coffee machine according to claim 8, wherein a bottom wall of the cavity is provided with a first boss, the lower end of the first screen body abutting an upper end face of the first boss, the second screen body being connected to the lower end of the first screen body, the secondary filter cavity being formed between the first screen body and a side wall of the cavity, the beverage cavity being formed between an outer peripheral surface of the first boss and the side wall of the cavity.

13. The coffee machine according to claim 12, wherein the upper end face of the first boss is provided with a second boss, the first screen body being sleeved at the second boss to be positioned in the grinding cavity.

14. The coffee machine according to claim 8, wherein the lower end of the first screen body abuts a bottom wall of the cavity, the secondary filter cavity being formed between a portion of the first screen body above the second screen body and a side wall of the cavity, the beverage cavity being formed between a portion of the first screen body below the second screen body and the side wall of the cavity.

15. The coffee machine according to claim 8, wherein an upper portion of the coffee machine screen is connected to the cover; or the upper portion of the coffee machine screen is connected to the cavity, and the cavity is connected to the cover.

16. The coffee machine according to claim 8, wherein diameter of the second filter pores of the second screen body on an upper surface is larger than diameter of the multiple first filter pores.

17. The coffee machine according to claim 8, wherein a third sealing ring is provided between the upper portion of the coffee machine screen and the cavity; the upper portion of the coffee machine screen is sealingly connected to the cover.

* * * * *